July 28, 1942.  T. T. MAYORQUIN  2,290,982
TELEGRAPH SIGNAL AUTOMATIC MANIPULATOR
Filed Aug. 12, 1940  2 Sheets-Sheet 1
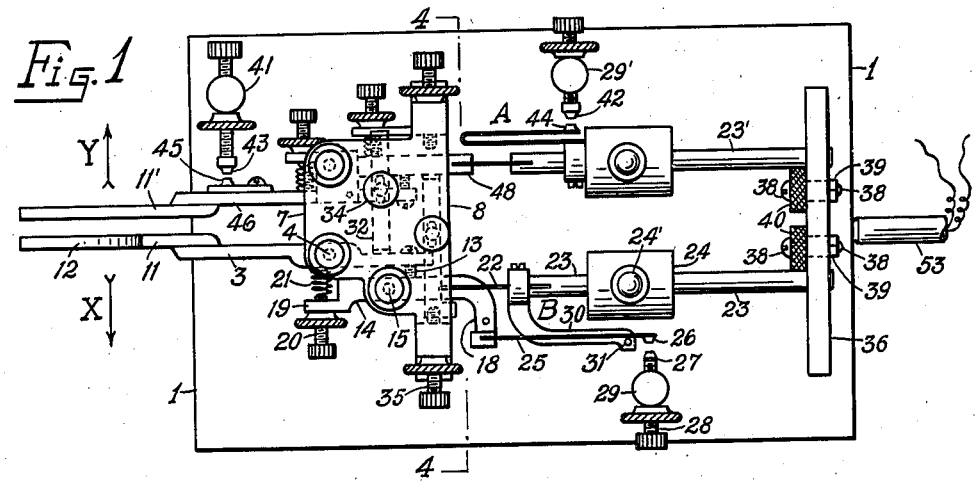
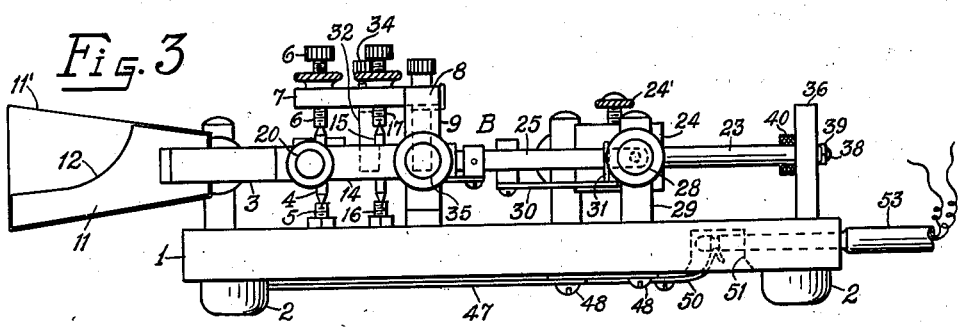
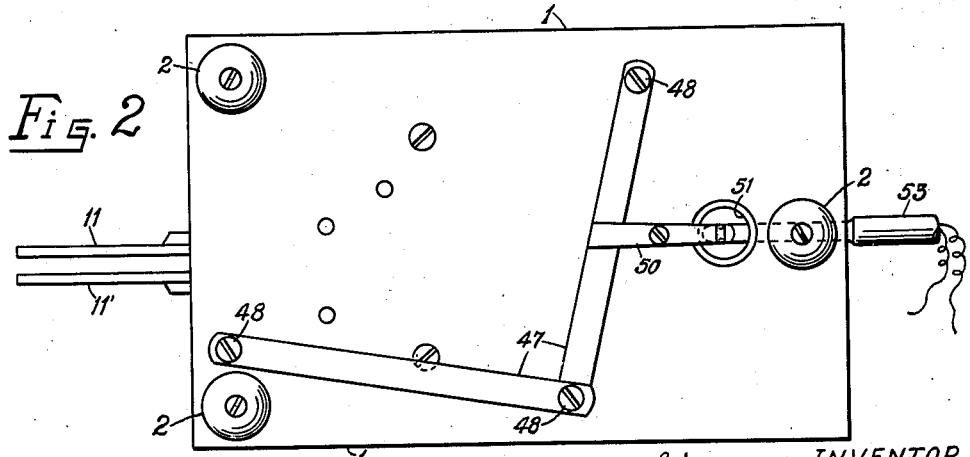

July 28, 1942.  T. T. MAYORQUIN  2,290,982
TELEGRAPH SIGNAL AUTOMATIC MANIPULATOR
Filed Aug. 12, 1940   2 Sheets-Sheet 2
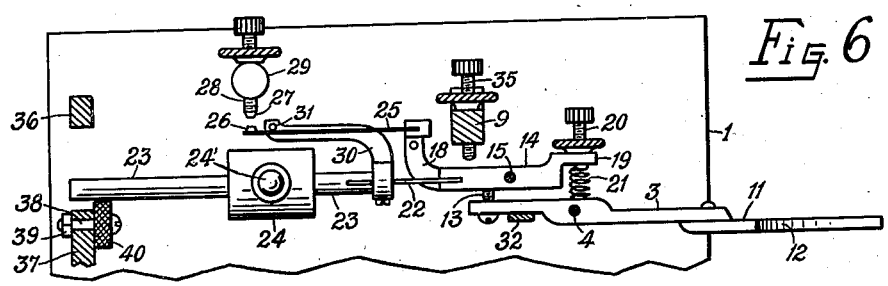
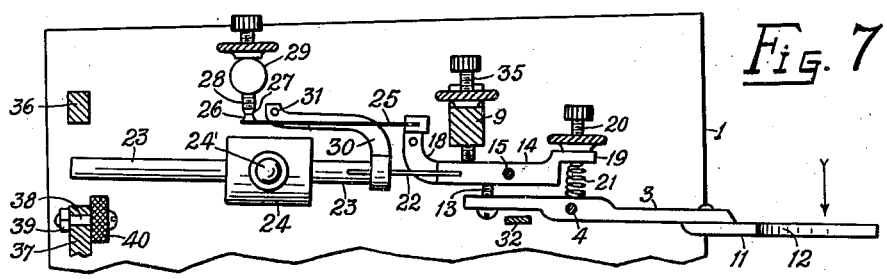
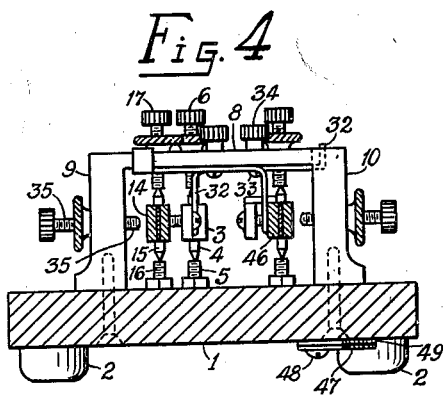
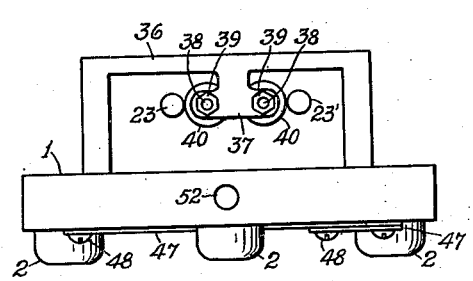
INVENTOR.
Tomas Tejera Mayorquin
BY Linger, Ehlert, Stern & Carlberg
ATTORNEYS Patented July 28, 1942

2,290,982

UNITED STATES PATENT OFFICE 2,290,982

TELEGRAPH SIGNAL AUTOMATIC MANIPULATOR

Tomas Tejera Mayorquin, Habana, Cuba

Application August 12, 1940, Serial No. 352,332
In Cuba March 25, 1940

2 Claims. (Cl. 178—82)

This invention relates to Morse signal automatic manipulators, and it has for its object the provision in the Vibroplex manipulators at present used for transmitting the dot signals in Morse telegraph system, of an improvement consisting of an additional vibrator mechanism adapted to automatically transmit in a single movement of the operator's fingers a series of dash signals, whereby my device has the advantage over the Vibroplex manipulator that it contributes to a greater extent to relieve the muscular and nervous stress to be exerted by telegraph operators.

The Vibroplex manipulators automatically transmit dot signals alone, and the required number of dash signals must be transmitted by repeated direct movement of the operator's fingers, whereas in my improved manipulator it is possible to transmit automatically with a single movement of the fingers a series of dashes of the Morse telegraph system.

Another object of the invention is to associate with the Vibroplex dot manipulator the dash automatic manipulator, so that dot and dash signals can be automatically transmitted with a minimum stress and with maximum speed and efficiency by means of side motions distinctly imparted to two adjacent levers by a sole hand's fingers.

The invention is described with reference to the figures of the accompanying drawings, in which like parts are indicated by the same reference numbers and letters, and of which:

Fig. 1 is a top plan view of the duplex automatic vibrator manipulator for use with the Morse dot and dash system.

Fig. 2 is a bottom plan view of the base thereof.

Fig. 3 is an outer elevational side view of the automatic manipulator for a series of Morse dashes.

Fig. 4 is a transverse vertical section view on line 4—4 of Fig. 1.

Fig. 5 is an end elevational view of the duplex manipulator, showing the shock-absorber bridge.

Fig. 6 is a top detailed plan view of the automatic manipulator for a series of Morse dashes, in resting position.

Fig. 7 is a detailed plan view of the automatic manipulator for a series of Morse dashes, in working position.

This duplex manipulator is composed of a metal base 1 supported on three stands made of electricity-insulating material 2, on the base 1 being disposed in close relationship a dot Vibroplex manipulator A of known construction and my new dash automatic manipulator B. Since the dot Vibroplex manipulator A is well known, I shall omit explaining its construction in detail, but reference will be made thereto in order that it may be understood how both Morse dot and dash automatic manipulators work in combination.

The dash automatic manipulator B is composed of a metallic lever 3 pivotally mounted on a vertical apex shaft 4 held between a lower screw 5 fixed to the base 1 and an upper screw 6 threadedly mounted in a threaded hole vertically formed in a horizontal plate 7 projecting backwards from a metal bridge 8 in transverse position above both manpulators and secured to two metal uprights 9 and 10 on the base 1. The lever 3 carries at its outer end a Bakelite vertical plate 11 positioned parallelly to the Bakelite vertical plate 11' of the dot automatic manipulator A and adjacently the same, the plate 11 having a curved cut 12 to allow the operator to operate both manipulators together with the fingers of the operator's right hand. The lever 3 has at its inner end a transversal screw 13 which serves as a bumper against another metallic lever 14 mounted adjacent the lever 3 on a vertical apex shaft 15 held between a lower screw 16 fixed to the base 1 and an upper screw 17 threadedly mounted in a threaded hole vertically formed in the horizontal plate 7, the lever 14 having at its outer end a vertical lug 19 in which is threadedly mounted a horizontal screw 20 on the projecting portion of which is wound a coil spring 21 whose free end rests against the side of the lever 3. On the inner end of lever 14 is partially embedded a vertical plain spring strip 22 which supports at its free end a vibratory horizontal bar 23 leaving parallelly to the vibratory bar 23' of the dot manipulator A and being provided with a weight 24 slidably adjusted by means of a set screw 24 to adjust the oscillation extent of bar 23. The lever 14 also carries at its inner end a curved arm 18 projecting therefrom towards the outer side of the spring 22 and beneath it and supports the end of a vertical plain spring strip 25 extending parallelly to the vertical spring 22 and carrying at its free end a movable electric contact 26 adapted to engage a stationary electric contact 27 carried at the end of a horizontal screw 28 threadedly mounted on an electricity-insulated upright 29 fixed on the base 1, and from the inner end of vibratory bar 23 projects laterally and beneath the spring strip 25 an arm 30 to the free end of which is rigidly secured a vertical pin 31 which in normal position remains adjacent the end portion of spring 25 at the same side thereof where the stationary contact 27 is placed.

The lateral movement of lever 3 is confined inwardly by a stop formed by the raised end of a plate 32 which is slidably mounted beneath the horizontal plate 7 and is adjusted in position by means of a vertical screw 33 threadedly mounted in a threaded hole in plate 7 and passing across a longitudinal slot in plate 32 which is adjusted in position by means of a nut 34 threaded on screw 33 and which tightens on plate 7, and the lateral movement of lever 14 is confined inwardly by a stop formed by a horizontal screw 35 threadedly mounted on upright 9.

The free ends of the vibratory bars 23 and 23' of both manipulators remain located beneath a metallic bridge 36 which is positioned on the immediate end of the base 1 and which carries a central depending lug 37 having holes in which are mounted horizontal screws 38 which are secured by nuts 39 and carry thick washers 40 serving as shock-absorbers against which the ends of said vibratory bars 23 and 23' bear in normal position.

The insulated upright 29 is electrically connected to the insulated uprights 29' and 41 carrying the stationary contacts 42 and 43 which are adapted to respectively contact two movable contacts 44 and 45 carried by the lever 46 of Vibroplex dot manipulator, through a metal plate 47 of angular shape which is fixed by screws 48 on the lower face of the base 1 and through the interposition of an electricity-insulating strip 49. To the plate 47 is soldered another straight metal plate 50 ending beneath a cavity 51 in the base 1 and into which said plate 50 is bent to form an electric terminal which is to be engaged by a plug 53 of two electric wires of well-known construction which also may contact separately the other electric terminal formed by the base 1, when said plug is passed through a hole 52 formed at the end of base 1 beneath the bridge 36.

It is known that by actuating the Bakelite plate 11' of the Vibroplex dot manipulator to the right as per the direction indicated by the arrow X in Fig. 1, a series of Morse dot signals can be obtained with a single movement of the operator right hand's thumb-finger, and by actuating the Bakelite plate 11' of the same Vibroplex manipulator to the left according to the direction indicated by the arrow Y in Fig. 1 a single Morse dash signal can be obtained but not a series of Morse dash signals, which operation may be effected here by the operator right hand's index-finger through the cut 12 in Bakelite plate 11 of manipulator B. However, by actuating the Bakelite plate 11 of my new dash manipulator B, a series of Morse dash signals can be obtained, in the following manner: the plate 11 is pressed to the left in the direction indicated by the arrow Y of Fig. 1 and held in that position, which is done with the operator right hand's third finger, and the lever 3 will then oscillate on its vertical pivot 4 and will cause the bumper 13 to push the rear arm of the lever 14 and the latter to oscillate on its vertical pivot 15 so that the movable contact 26 of vertical plain spring strip 25 secured to the lever 14 will approach the stationary contact 27 until to contact it and close an electric circuit through the device; and this position is maintained while the pressure on plate 11 is maintained. At the same time, the vibratory bar 23 starts its oscillation outwards and it separates from the respective shock-absorber 40 and when the vibratory bar 23 is drawn backward to complete its oscillation movement, both contacts 26 and 27 will remain engaged until that after completion of the second-half oscillation movement of the bar 23 the end of the vertical spring strip 25 will be caused to move backward by the stop pin 31 and bring contacts 26 and 27 out of connection, thus it permitting that in the interval of a full oscillation movement of the bar 23 a single Morse dash signal be marked. As the vibratory movement of the bar 23 is continued while the plate 11 is pressed to the left, the oscillation of the vibratory 23 will be repeated in the manner above explained, to cause the consecutive engagement and disengagement of the contacts 26 and 27 during the time required to mark a new Morse dash signal, and so forth until the pressure on Bakelite plate 11 to the left is discontinued, at which time the vibratory movement of bar 11 and the marking of Morse dash signals will cease.

It is obvious that the construction details of my new Morse dash signal manipulator can be varied within certain limits, without by this reason altering the essential character of the invention which is such as defined in the appended claims.

What I claim is:

1. A telegraph signal automatic manipulator for producing a series of dash signals by a single movement of the operator's fingers, which comprises a supporting base, a lever pivotally mounted on a shaft fixed to the supporting base, a plain spring strip secured to an end of said lever, a vibratory bar secured to the free end of said spring strip, a second plain spring strip carried by said lever laterally of the vibratory bar and carrying at its free end a movable electric contact, a stationary electric contact fixed on the supporting base and adapted to be engaged by the movable contact, and a stop means laterally projecting from the vibratory bar and adapted to disengage the movable contact from the stationary contact at the drawback movement of the vibratory bar after having produced a delayed engagement of both movable and stationary contacts, forming thereby a series of Morse dash signals.

2. A telegraph signal automatic manipulator for producing a series of dash signals by a single movement of the operator's fingers, which comprises a supporting base, a lever pivotally mounted on a shaft fixed to the supporting base, a plain spring strip secured to an end of said lever, a vibratory bar secured to the free end of said spring strip, an arm laterally projecting from the same end of said lever, a second plain spring strip secured to the free end of said arm and carrying at its free end a movable electric contact, a stationary electric contact placed on the supporting base and adapted to be engaged by the movable contact when said lever is pressed, an arm laterally projecting from the vibratory bar and directed beneath the second spring strip, and a raised stop pin projecting from the free end of said last mentioned arm and adapted to disengage the movable contact from the stationary contact at the end of a complete oscillation of the producing vibratory bar after producing a delayed engagement of both movable and stationary contacts which produce a Morse dash signal, forming thereby a Morse space between two consecutive dash signals.

TOMAS TEJERA MAYORQUIN.